(12) United States Patent
Altmann

(10) Patent No.: US 8,644,334 B2
(45) Date of Patent: Feb. 4, 2014

(54) MESSAGING TO PROVIDE DATA LINK INTEGRITY

(75) Inventor: William Conrad Altmann, San Jose, CA (US)

(73) Assignee: Silicon Image, Inc., Sunnyvale, CA (US)

(*) Notice: Subject to any disclaimer, the term of this patent is extended or adjusted under 35 U.S.C. 154(b) by 614 days.

(21) Appl. No.: 12/570,874

(22) Filed: Sep. 30, 2009

(65) Prior Publication Data

US 2011/0075682 A1    Mar. 31, 2011

(51) Int. Cl.
*H04J 3/22* (2006.01)

(52) U.S. Cl.
USPC ............... 370/465; 370/474; 375/240.26

(58) Field of Classification Search
USPC ............... 370/465, 474; 375/240.26
See application file for complete search history.

(56) References Cited

U.S. PATENT DOCUMENTS

| | | | |
|---|---|---|---|
| 5,668,880 A | 9/1997 | Alajajian | |
| 5,949,777 A | 9/1999 | Uyesugi et al. | |
| 6,791,538 B2* | 9/2004 | Van Vugt | 345/204 |
| 6,820,049 B1 | 11/2004 | Monroe et al. | |
| 7,088,398 B1* | 8/2006 | Wolf et al. | 348/423.1 |
| 7,131,004 B1 | 10/2006 | Lyle | |
| 7,242,766 B1 | 7/2007 | Lyle | |
| 7,702,101 B2* | 4/2010 | Malcolm et al. | 380/37 |
| 2002/0035690 A1 | 3/2002 | Nakano | |
| 2002/0164963 A1 | 11/2002 | Tehrani et al. | |
| 2003/0043142 A1 | 3/2003 | Ishibashi | |
| 2005/0117601 A1 | 6/2005 | Anderson et al. | |
| 2007/0009060 A1* | 1/2007 | Lavelle et al. | 375/295 |
| 2009/0015723 A1 | 1/2009 | Doumuki | |
| 2009/0222905 A1 | 9/2009 | Choi et al. | |

FOREIGN PATENT DOCUMENTS

| | | |
|---|---|---|
| EP | 1995952 | 11/2008 |
| WO | WO-9713353 | 4/1997 |
| WO | WO-0122302 | 3/2001 |

OTHER PUBLICATIONS

International Search Report and Written Opinion for International Patent Application No. PCT/US2010/041246 mailed Nov. 8, 2010, 17 pages.
International Search Report and Written Opinion for International Patent Application No. PCT/US2010/050400 mailed Nov. 30, 2010, 15 pages.
Office Action mailed Nov. 2, 2012, in U.S. Appl. No. 12/512,877, 16 pages.

* cited by examiner

*Primary Examiner* — Jason Mattis
(74) *Attorney, Agent, or Firm* — Blakely Sokoloff Taylor & Zafman LLP

(57) ABSTRACT

Embodiments of the invention are generally directed to messaging to provide data link integrity. An embodiment of a method includes transmitting a data stream over a data link from a first device to a second device, the data stream including multiple frames, the data stream being transmitted in a first mode. The method further includes determining a data transmission mode change from the first mode to a second mode for the transmission of the data stream from the first device to the second device, generating mode packets, each mode packet including fields to define a plurality of mode elements, the fields of the mode packet being set to indicate the data transmission mode change, and transmitting the mode packets to the second device prior to implementing the data transmission mode change.

32 Claims, 10 Drawing Sheets

MESSAGING TO PROVIDE DATA LINK INTEGRITY

TECHNICAL FIELD

Embodiments of the invention generally relate to the field of data communications and, more particularly, provision of messaging to provide data link integrity.

BACKGROUND

In certain systems, data may be transmitted over a data link between a first device and a second device. For example, data may include a data stream of audio/video data or other content data sent from a first device to second device, where the second device may either utilize the content data or re-transmit such data to another device. The stream of data may further be encrypted for security in the transmission of the content data.

In the data transfer operation, the data stream that is being transmitted may be changed from a first data mode to a second data mode, where the receiving device is required to interpret and handle the data in the second mode in a manner that is different than data in the first mode.

In conventional systems, a device that is receiving a data stream may detect the change in mode from the first mode to the second mode, and then change operations accordingly. However, a certain amount of data may be interpreted according to the first mode until such time as the receiving device has switched modes. If, for example, the streaming data includes video and audio data the result may be improper display or presentation of data for a period of time until the second device is able to transition to the second mode.

U.S. patent application Ser. No. 12/512,877, filed Jul. 30, 2009, entitled "Signalling for Transitions Between Modes of Data Transmission", regards provision of signals in a side control channel prior to changes in a data stream.

BRIEF DESCRIPTION OF THE DRAWINGS

Embodiments of the invention are illustrated by way of example, and not by way of limitation, in the figures of the accompanying drawings in which like reference numerals refer to similar elements.

SUMMARY

Figure 1:
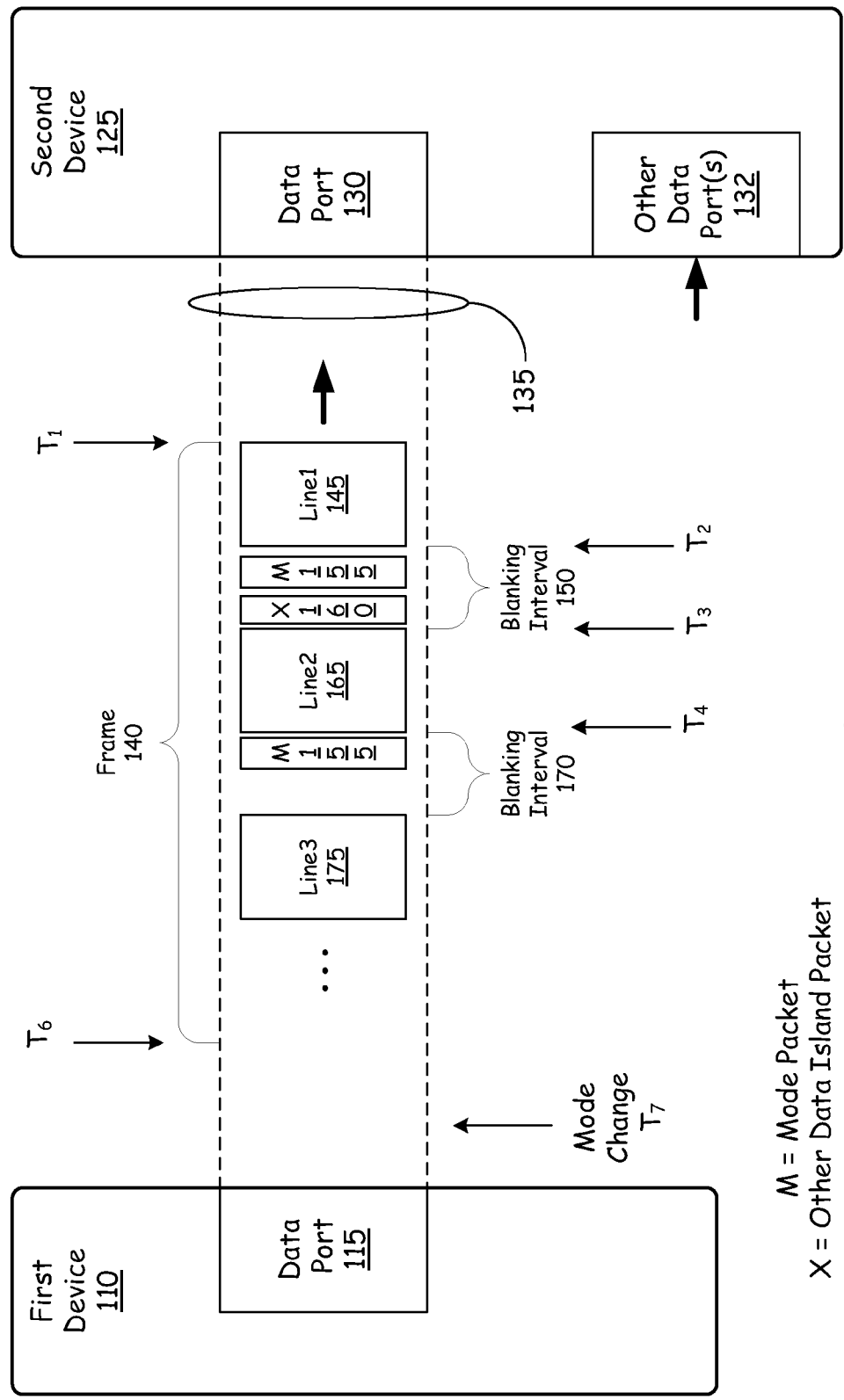
FIG. 1 is an illustration of an embodiment of a system for transmission of data between devices.

Embodiments of the invention are generally directed to provision of messaging to provide data link integrity.

In a first aspect of the invention, an embodiment of a method includes transmitting a data stream over a data link from a first device to a second device, the data stream including multiple frames, the data stream being transmitted in a first mode. The method further includes determining a data transmission mode change from the first mode to a second mode for the transmission of the data stream from the first device to the second device, and generating mode packets, each mode packet including fields to define a plurality of mode elements, the fields of the mode packet being set to indicate the data transmission mode change. The mode packets are transmitted to the second device prior to implementing the data transmission mode change.

In a second aspect of the invention, an embodiment of method includes receiving a data stream over a data link from a first device at the second device, the data stream including a plurality of frames of data. The data link is sampled for one or more mode packets, and a mode packet is captured during the sampling of the data link, the mode packet indicating a mode of data transmission from the first device. An anticipated change in mode of data transmission from a first mode to a second mode is determined based on the mode packet.

DETAILED DESCRIPTION

Embodiments of the invention are generally directed to provision of messaging to provide data link integrity.

In some embodiments, a system may provide for messaging to assist in maintaining data integrity in connection with transitions between modes of data transmission. In a system, a first device may transmit a stream of content data to a second device. The data may include, for example, audio/video data, including HDMI™ (High-Definition Multimedia Interface) data and MHL™ (Mobile HD Link) data, where HDMI and MHL provide audio/video interfaces for transmitting uncompressed digital data. The data may be encrypted prior to transmission, such as encryption utilizing HDCP™ (High Bandwidth Digital Content Protection). HDMI may be described by the provisions of HDMI specifications, including "High-Definition Multimedia Interface", Version 1.4, released May 28, 2009 and "High-Definition Multimedia Interface", Version 1.3, released Jun. 22, 2006, and other earlier and later issued documents. MHL may be described by the provisions of MHL specifications. HDCP may be described in "High-bandwidth Digital Content Protection System" Revision 1.3, released Dec. 21, 2006 and other earlier and later issued documents.

In some embodiments, a transmitter unit may transmit multiple mode packets to inform a receiver unit regarding an anticipated data transmission mode change before the change to the data stream occurs. In some embodiments, the transmitter transmits the multiple mode packets during blanking intervals between transmissions of content data, such as between lines of data in a data frame. In some embodiments, a transmitter may transmit mode packet continuously, the mode packets reflecting anticipated data transmission mode values and providing notice when the data transmission mode for the transmitter is anticipated to change. Further, such mode packets may provide notice of instability of a data stream during transition between modes, and notice when a transition between modes has been completed. In some embodiments, the transmitter may transmit sufficient numbers of mode packets to allow a receiver to detect the mode packet, even though the receiver is sampling from multiple different data ports. In some embodiments, the transmitter may, for example, transmit one or more mode packets during each blanking period, in a majority of such blanking periods, or during each blanking period having sufficient space in light of other data to be transferred during the blanking period to accommodate a mode packet.

In some embodiments, a receiver may provide a minimum frequency of sampling to allow capture of mode packets, such as, for example, sampling a blanking interval at least once in each frame of data. In some embodiments, a receiver unit may detect and capture one or more of the transmitted mode packets, and, in response to the one or more mode packets, may take actions in anticipation of the data transmission mode change. In different implementations the change to the data transmission mode may be initiated by various elements, such as the transmitter itself or by a user, such as a user who inputs a request for a change in operation. In some embodiments, a change in data transmission mode may include a change in status of content protection, as when switching from a non-protected content to protected content. In some embodiments, a change to a data transmission mode may include interrupting the data stream.

In some embodiments, multiple mode packets are sent between lines of a frame, and are not limited to insertion of information in a vertical blanking interval. In some embodiments, a transmitting unit inserts sufficient mode packets into available spaces in blanking intervals to allow a receiving device to detect and capture one or more mode packets of a frame. In some embodiments, a receiving device may include a multi-port receiving device that may be capable of checking each port at any time, and thus may require the transmission of multiple mode packets from the transmitting device in order to capture a mode packet during a frame.

In some embodiments, the transmission of mode packets in a data link allows for the mode packets to be synchronized with the transmission of content data. For example, in some embodiments frames of data may flow from a transmitter to a receiver, with the mode packets being transmitted consistently within each frame of data, or with the mode packets being inserted in blanking periods of frames that are transmitted in advance of a mode change. In some embodiments, the use of mode packets to provide notice of changes in data transmission mode may enable the implementation of logic in receiving chips to recognize arriving mode packets and react automatically, without depending on software or firmware that are running at a different speed than the logic processing. For example, in some embodiments, a receiving system may operate to address mode packets without requiring a microprocessor or software.

In some embodiments, a system may be capable of utilizing both mode packets received via the data link (an in-band notification) and notifications received via another communication channel (a side-band notification). For example, side-band notifications may be combined with in-band mode packets in a unit such as a "bridge" chip that converts from a protocol that utilizes mode packets to a protocol that only supports side-band messages.

In some embodiments, a data stream may be transmitted in an encrypted form while each mode packet is transmitted in an unencrypted form. In some embodiments, a mode packet may thus be transmitted without itself being encrypted. The transmission of such unencrypted mode packets allows a receiving device to obtain a warning regarding an anticipated change in data transmission mode without being required to decrypt the received mode packets. In some embodiments, the transmission of the mode packets in unencrypted form allows a transmitting device to insert mode packets into a data stream without being required to decrypt encrypted content, and allows a receiving device to remove or strip out mode packets from a data stream without affecting the encrypted content data.

In some embodiments, one or more flags in each mode packet may provide notice regarding a change in data transmission mode and regarding stability status of the data link with regard to the change in data transmission mode. In some embodiments, such flags may differentiate between mode packets sent in advance of a change in data transmission mode while the link is still in a stable state (i.e., before the transition to the new data transmission mode begins); mode packets sent during the transition between data transmission modes (for example, when mode packets may still be sampleable but during a time period when frame timings have not settled into the new data transmission mode yet); and mode packets sent after any new mode is stable and without any anticipation of a change in mode (mode packets sent in normal operation prior to any mode change and after any mode change has stabilized). In addition, one or more flags of each mode packet may provide notice of a type of mode change that is anticipated. In some embodiments, a transmitter may change certain types of mode aspects at different times as other mode aspects, and the flags may indicate the aspect of mode change that is anticipated. In one example regarding the transmission of audiovisual data, a video mode may be changed independently of an audio mode, such as a change in one such mode aspect shortly before a change in the other such mode aspect.

Actions taken by a receiver in response to detection and capture of one or more packets indicating an anticipated change in data transmission mode may vary in different embodiments. In some embodiments, actions that may be taken by the receiver prior to the change in the data stream may include muting or blanking of data such as video or audio data. As used herein, muting refers to a reduction in a level of a signal, such as, for example, an audio signal being muted by a reduction in volume of the audio signal.

In one specific application, a system is to handle interruptions to a data stream when the source system is encrypting and the sink system is decrypting. In an encryption protocol such as HDCP, any interruption to a stable sequence of sync signals and clock may cause the decryption engine to be out of phase with the encryption engine. In some cases this "out of phase" condition cannot be detected in the sink, and the decryption would fail. In some embodiments, if a mode packet is sent from the transmitter to the receiver before a mode change that otherwise would upset HDCP or other encryption protocol, then a device such as a receiver logic or an intervening chip in the interconnect may be utilized to gracefully handle the data stream break. In some embodiments, a protocol change includes application of this concept. In some embodiments, a bridge device receiving the incoming data stream, as encrypted by the transmitter, may detect the mode change. In some embodiments, the bridge device may decrypt the incoming data stream and re-encrypt the data stream going to the downstream receiver. In some embodiments, if the incoming stream is interrupted, the bridge operates to maintain a stable downstream encrypted stream. In an example, a slower speed warning message may be sent across the downstream protocol so that the final receiver stage can reset itself without locking up for lack of synchronization. In this manner, the bridge device may allow the interconnect to "coast" through the mode change.

In some embodiments, a type of response to an impending change in data mode may be dependent on the type of mode change. For example, a significant change in mode may require a more significant response to address transitional issues. In one example, a mode change that requires more time to accomplish may require a longer time period during which transitional actions are taken.

FIG. 1 is an illustration of an embodiment of a system for transmission of data between devices. In this illustration, a first device 110 transmits a data stream over a data channel 135 to a second device 125, illustrated as, for example, a transmission from a data port 115 of the first device 110 to a data port 130 of the second device 125. In one embodiment, the data channel may be an HDMI data channel or MHL data channel. In some embodiments, the second device 125 may include one or more other data ports 132. In some embodiments, the second device 125 may read data from the data ports 130-132 at different times.

In FIG. 1, the first device 110 may transmit the data stream in multiple different modes, and in operation the first device may change modes at various times. The different modes may represent various different kinds of data, and data of each such mode may be interpreted in a different way. In one example, the modes may include different types of video data, such as a first mode representing a first progressive video mode and then the mode representing a second progressive video mode, which may represent a transition that can be accomplished relatively quickly. In a second example, a first mode may represent an interlaced video mode and a second mode may represent a progressive video mode, which may represent a transition that requires more time flushing of the de-interlacer. In one example, a transition to the second mode may include a break in transmission in which no data is transmitted, which may be followed by data in another format. A first device and a second device may transfer any number of different modes of data between the devices.

As illustrated, the first device 110 may begin transmission of data of a frame of data 140 at time $T_1$, where the frame includes multiple lines of data and periods of time between such lines, referred to as blanking periods, the frame of data continuing until a time $T_6$. In some embodiments, the lines of data may include encrypted content data. In some embodiments, the first device 110 commences transfer for a first line (line1 145) at the beginning of the frame 140 at time $T_2$. Line1 145 ends at time $T_2$, and between time $T_2$ and a beginning of a second line (line 2 165) at a time $T_3$ (during a blanking interval 155) one or more other data messages may be transferred, including, for example, a mode packet 155 and a data island 160. In some embodiments, the mode packet 155 may itself be unencrypted, thereby allowing the second device to remove mode packets from the data stream without affecting the content data, which may be encrypted. In this illustration, line2 continues until a time $T_4$, and a second blanking interval 170 occurs between $T_4$ and a time $T_5$, during which another mode packet 155 is transmitted to the second device 125. In some embodiments, the first device may transmit the mode packets continuously, with the mode packets reflecting anticipated transmission mode values.

In some embodiments, the second device 125 utilizes multiple ports 130-132, and is not capable of detecting and capturing data at each port at the same time, and may be polling the ports at particular times. Thus, the second device 125 may require the reception of multiple mode packets at data port 132 to allow the second device sufficient opportunity to capture a mode packet 155. In some embodiments, the first device may transmit one or more mode packets in, for example, each blanking period, during a majority of blanking periods, or during each blanking period in which there is sufficient space to accommodate a mode packet. In some embodiments, a receiver may provide a minimum frequency of sampling to allow capture of mode packets, such as, for example, sampling a blanking interval at least once in each frame of data. In some embodiments, each of the one or more mode packets 155 is transferred and arrives at the second device 125 for detection and capture prior to the intended change in modes (in anticipation of, for example, the data transmission mode change occurring at time $T_7$) such that the second device 125 may anticipate a change to a second data transmission mode prior to the arrival of data elements in such mode.

Figure 2:
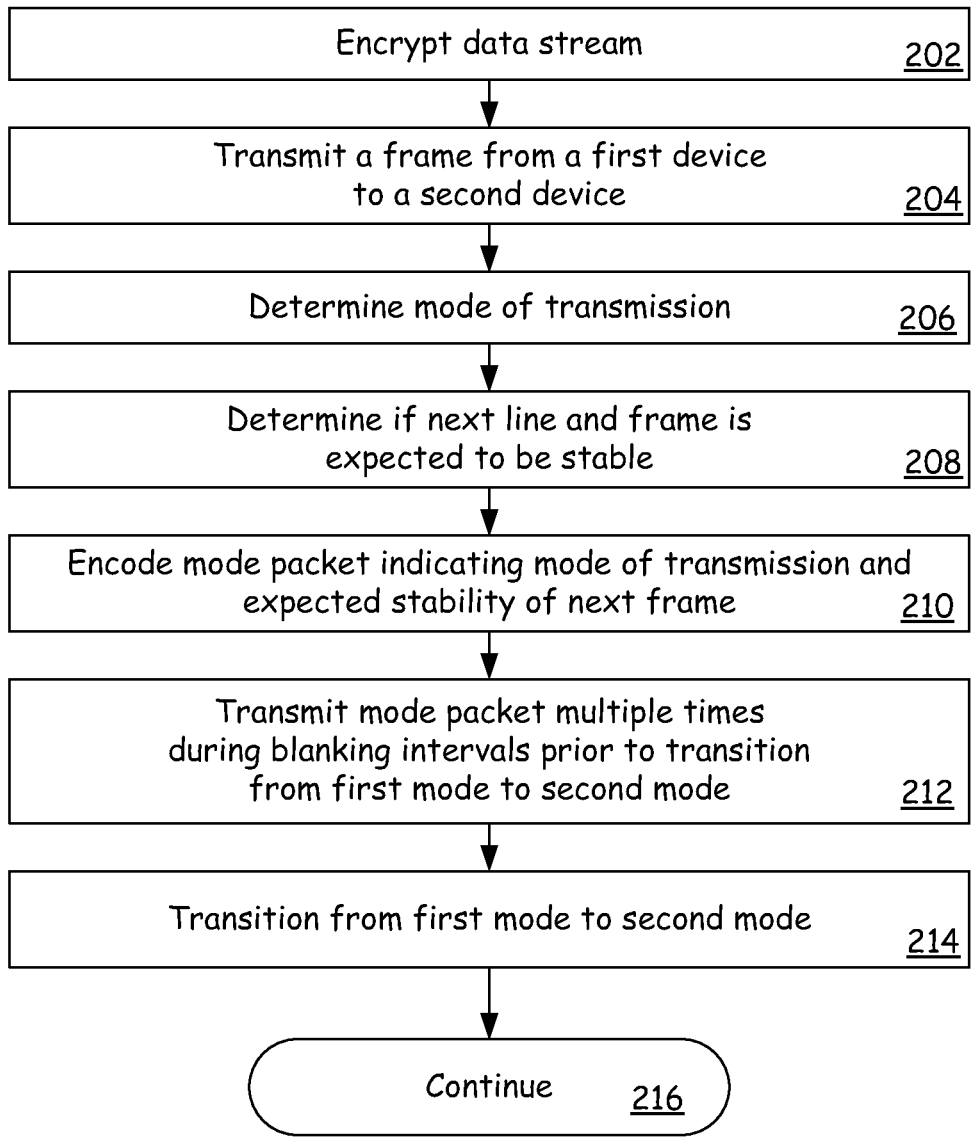
FIG. 2 is a flow chart to illustrate a process for transmission of data.

FIG. 2 is a flow chart to illustrate a process for transmission of data. In this illustration, a transmitting device encrypts a data stream 202 and transmits a frame of data to from the first device to a second device 204. The transmitting device will then determine the current mode of transmission 206, and determine if the next line and frame is expected to be stable 208. Upon making such determination, the transmitting device encodes a mode packet that indicates the anticipated mode of transmission and an expected stability of the next frame 210. In some embodiments, the transmitting device proceeds to transmit the mode packet multiple times during blanking intervals of the frame, with the mode packets being transmitted prior to the transition from the first mode to the second. In some embodiments, the transmitting device transmits the mode packet in unencrypted form. In some embodiments, the transmitting device may transmit the mode packets continuously. In some embodiments, the transmitting device may transmit sufficient mode packets to allow a receiving device an opportunity to capture a mode packet prior to a mode change, such as transmitting one or more mode packets in, for example, each blanking period, during a majority of blanking periods, or during each blanking period in which there is sufficient space to accommodate a mode packet. In some embodiments the mode packets contain data transmission mode values in anticipation of any change in modes to allow a receiving device sufficient time to take actions necessary to address the change in modes, and are transmitted multiple times to allow, for example, a receiving device that is sampling multiple data ports during different time periods to sample at least one mode packet prior to the transition between modes. The transmitting device then transitions from the first mode to the second mode.

Figure 3:
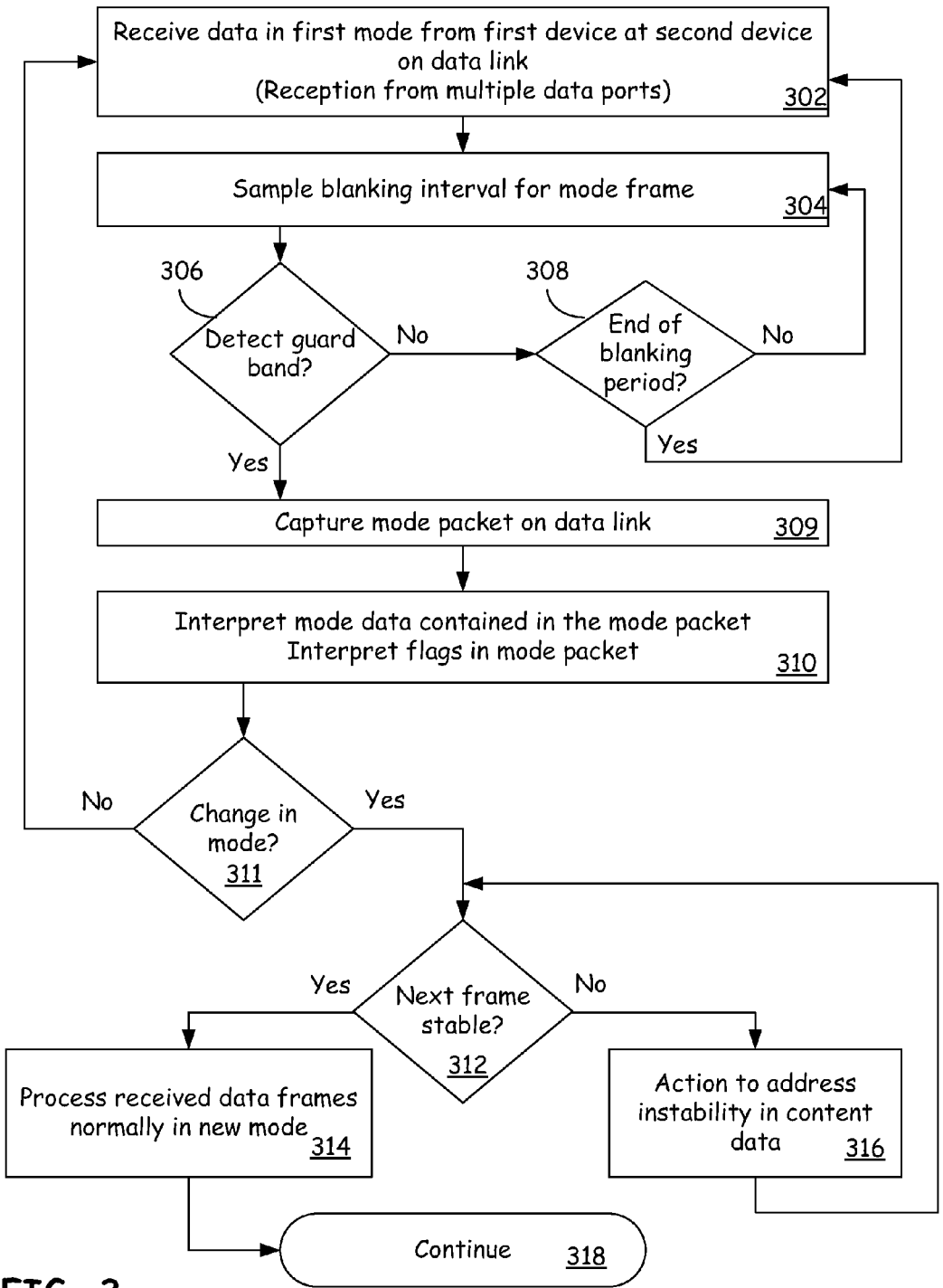
FIG. 3 is a flow chart to illustrate a process for reception of data.

FIG. 3 is a flow chart to illustrate a process for reception of data. In this illustration, a receiving device receives data in a first mode from a first device at a second device 302. The receiving device may receive data from multiple different data ports at different times, and thus may not be sampling data at a particular data port at a particular time. In some embodiments, the second device samples blanking intervals between data transmission at each port, such as blanking intervals between lines of a frame of data 304. In some embodiments, the receiving device may provide a minimum frequency of sampling to allow capture of mode packets, such as, for example, sampling a blanking interval at least once in each frame data. If the second device detects a guard band 306 at a data port, the guard band being a part of a mode packet to announce changes in operation for the data stream received at the data port, then the mode packet is captured on the data link 309. If a guard band is not detected and the end of the blanking period is reached 308 the second device returns to receiving data in the first mode from the first device on the data link 302.

Upon capturing a mode packet on the data link 309 the mode data contained in the mode packet is interpreted 310. In some embodiments, the interpretation of the mode data contained in the mode packet may include interpretation of one or more flags, such as flags 416 illustrated in FIG. 4. If the mode packet indicates no change in data transmission mode 311, then the second device may continue with receiving data in the first mode on the data link 302. If the mode packet indicates a change in data transmission mode, then the second device may take action to address the mode change. In some embodiments, if, according the mode data in the mode packet, the next frame is expected to be stable 312, the second device may process the received frames normally in the new mode 314, and continue normal processing 318. If the next frame is not expected to be stable, the second device takes action to address the instability in content data 316 until the frame is stable 312 and the second device can process the received frames normally in the new mode 314.

Figure 4:
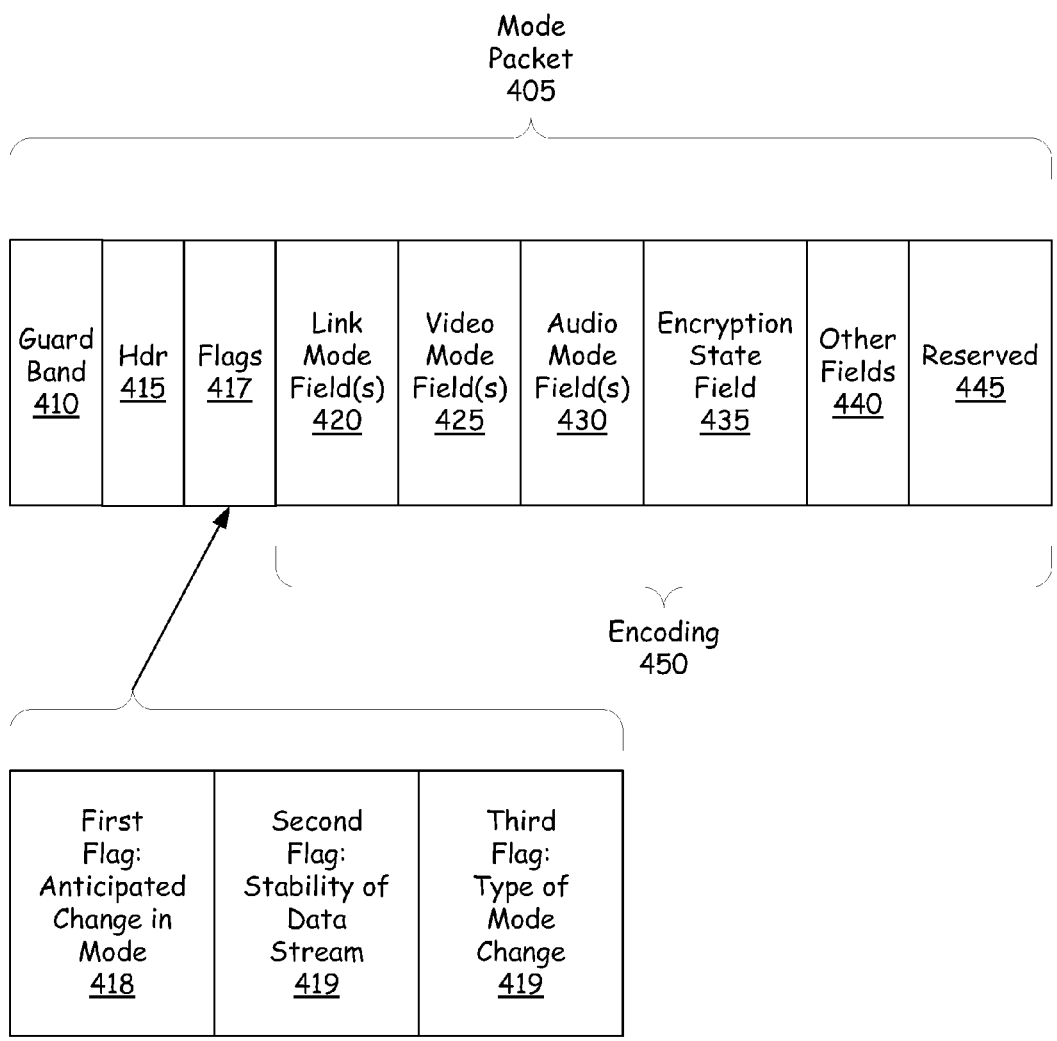
FIG. 4 is a illustration of a mode packet for transmission in an embodiment of system.

FIG. 4 is an illustration of a mode packet for transmission in an embodiment of system. In some embodiments, a mode packet 405 may begin with a guard band 410 for use in detecting and capturing the mode packet, and a header 415 containing required identification information. In some embodiments, the mode packet may include one or more flags 416 to provide notice to a receiving device regarding data transmission mode changes. In some embodiments, the flags 416 may include, for example, a first flag 417 indicating an anticipated change in mode and a second flag 418 may indicate anticipated instability of a data stream during a transition to a new data transmission mode. Such flags may thus differentiate between, for example: (1) Mode packets sent in advance of a change in data transmission mode while the link is still in a stable state (the first flag 417 may be active to indicate an anticipated change in data transmission mode, while the second flag 418 may be inactive to indicate stability of the data stream prior to transition to the new mode); (2) mode packets sent during the transition between data transmission modes (both the first flag 417 and the second flag 418 may be active to indicate the change in data transmission mode and instability of the data stream during transition to the new mode); and (3) mode packets sent after any new mode is stable and without any anticipation of a change in mode (both the first flag 417 and the second flag 418 may be inactive to indicate no anticipated change in data transmission mode and current stability of the data stream). In addition, in some embodiments the flags 416 may include more or more flags (indicated as third flag 419) to indicate a type of anticipated mode change, including, but not limited to, a change in a video mode, a color space mode, a link format mode, an audio mode, a content-protection-status mode, or other modes. While FIG. 4 illustrates a particular set of flags, other flags and packet data may be utilized to provide notice of mode information, including anticipated mode changes, stability of data links, and type of mode changes.

In some embodiments, the mode packet may further include encoding fields 450 to identify mode values. In some embodiments in which audiovisual data is transferred the encoding fields may include one more link mode fields 420, video mode fields 425, and audio mode fields 430, as well as an encryption state field 435 to reflect the encryption (or content protection) of the content data. The encoding fields may vary in different embodiments dependent on factors such as the type of content data that is transferred in a data stream. In some embodiments there may be other fields 440 and reserved fields 445 for future modification.

Figure 5:
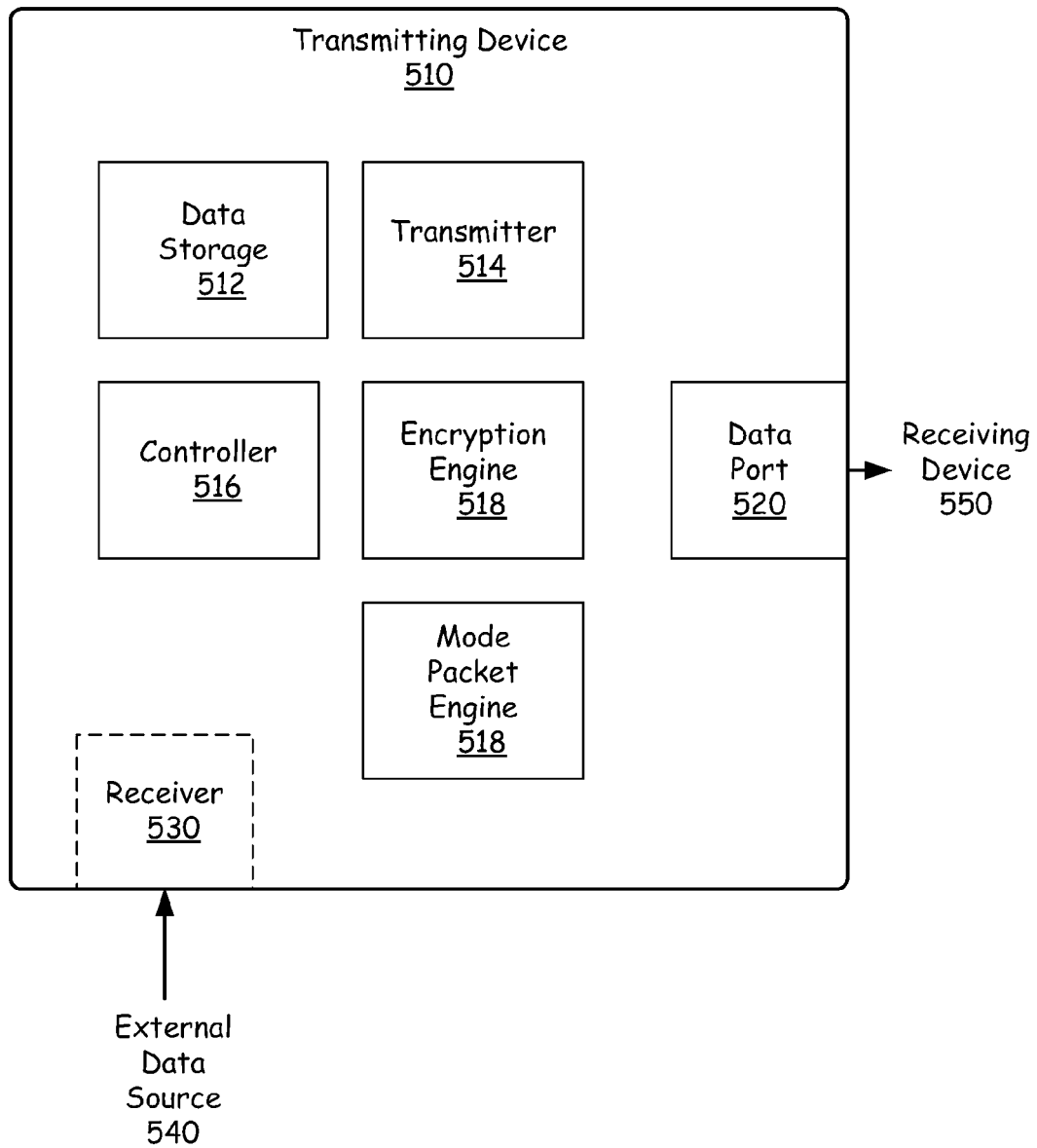
FIG. 5 is an illustration of an embodiment of a transmitting device.

FIG. 5 is an illustration of an embodiment of a transmitting device. In some embodiments, a transmitting device 510 includes a transmitter 514 for the transmission of data, a controller 516 to control data transmission, and an encryption engine 518 to encrypt data prior to transmission. The transmitting device may further include data storage 512 for the storage of data prior to transmission, and a receiver 530 to receive certain data from an external data source 540 prior to transmission.

In some embodiments, the transmitting device 510 includes a data port 520 for the transmission of data to a receiving device 610 (such as receiving device 610 illustrated in FIG. 6), wherein the data includes content data and other data. In some embodiments, the data may be transmitted in frames of data include there are periods of content data (lines of data) with blanking periods between the lines of data, with other types of data (such as data in data islands) being transmitted during the blanking periods. In some embodiments, the transmitting device may utilize the encryption engine 518 to encrypt the content data. In some embodiments, the transmitting device 510 may change the transmission of data during operation. In some embodiments, the transmitting device transmits data in multiple different modes over the data port 520, and may, for example, transition from a first mode to a second mode. In some embodiments, the second mode may include a break in transmission of data in which no data is transmitted, which may be followed by transmission of data in a second format.

In some embodiments, the transmitting device 510 transmits mode packets via the data port 520 to the receiving device 610. In some embodiments, the mode packets may provide notice to the receiving device in anticipation of the transmitting device 510 transitioning from the first mode to the second mode. In some embodiments, the transmitting device 510 transmits multiple mode packets during multiple blanking intervals between transmissions of content data from the transmitting device 510 to the receiving device 610 to allow the receiving device 610 to capture such mode packets and take action in anticipation of the mode change. In some embodiments, the transmitting device may transmit the mode packets in unencrypted form.

Figure 6:
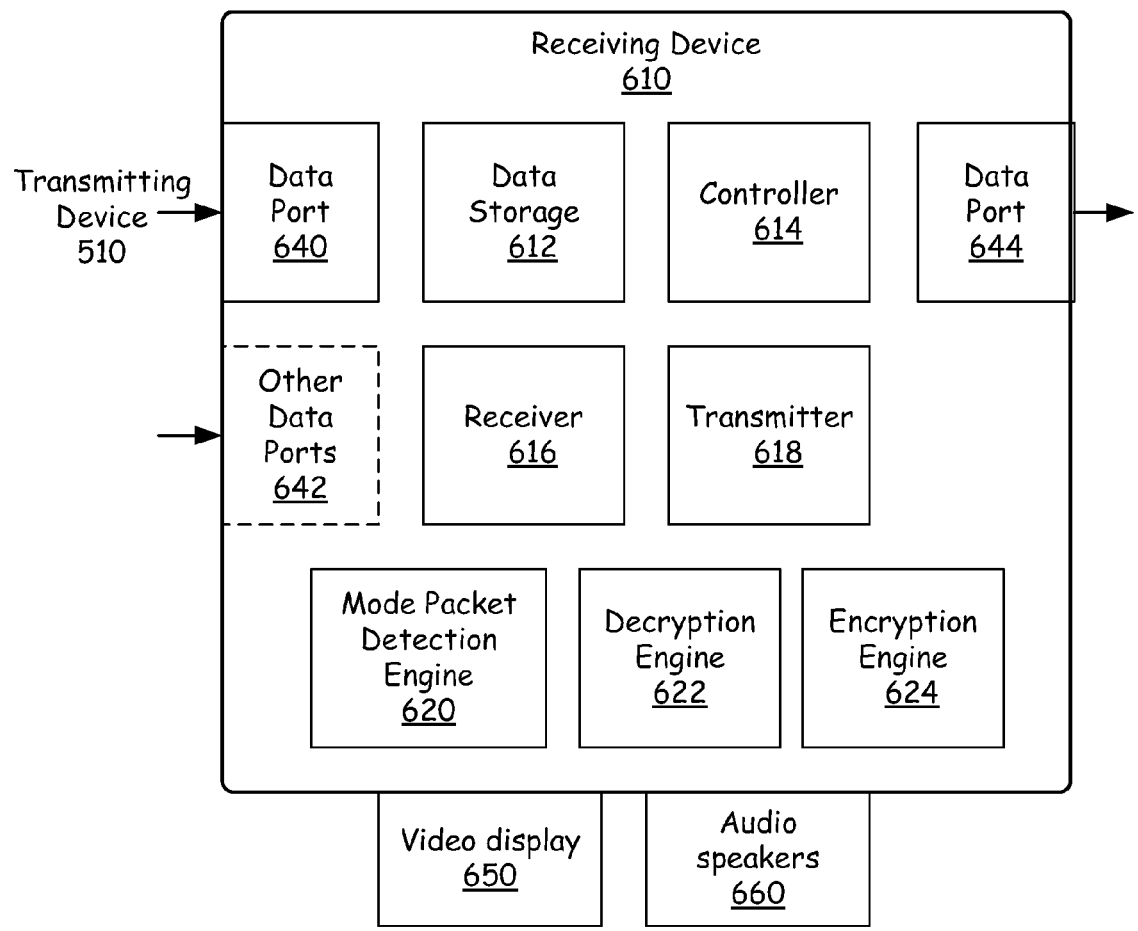
FIG. 6 is an illustration of an embodiment of a receiving device.

FIG. 6 is an illustration of an embodiment of a receiving device. A receiving device 610 may include a sink device that utilizes received data, or a bridge device that receives data and transfers such data to another device. In some embodiments, a receiving device 610 may include a controller 614 to control data operation, a receiver 616 to receive data transmission, and a decryption engine 622 to decrypt received data, together with a data port 640 for receipt of a data stream from a transmitting device 510 (such as transmitting device 510 illustrated in FIG. 5). In some embodiments, the receiving device includes a mode packet detection engine to detect and interpret received mode packets. If the receiving device 610 is a sink device, the receiving device may include or may be coupled with one or more devices to use received data, including, for example, a video display 650 and audio speakers 660. The receiving device 610 may also include a data storage 612 for storage of received data, a transmitter 618 to transmit data to another device, an encryption engine 622 to re-encrypt data that is being transmitted to another device, and a second data port 644 for the transmission of data to another device.

In some embodiments, the received data from the transmitting device 510 includes content data and other data. In some embodiments, the data may be transmitted in frames of data that include periods of content data (lines of data) with blanking periods between the lines of data, with other types of data (such as data in data islands) being transmitted during the blanking periods. In some embodiments, the received content data may be encrypted. In some embodiments, the transmitting device 510 may change the transmission of data during operation. In some embodiments, data is received in multiple different modes over the data port 640, and such data may, for example, transition from a first mode to a second mode. In some embodiments, the second mode may include a break in transmission of data in which no data is transmitted, which may be followed by transmission of data in a second format.

In some embodiments, the receiving device 610 may be operable to detect mode packets transmitted during the blanking intervals utilizing the mode packet detection engine. In some embodiments, the receiving device may sample data during multiple blanking periods of each frame of data to detect any mode packets, and may be required to provide a minimum amount of sampling, such as sampling during at least one blanking interval in each frame of data. In some embodiments, the receiving device 510 may detect a guard band at a start of a mode packet and, in response to such guard band detection, the receiving device may capture the mode packet.

In some a mode packet provides mode information regarding an anticipated mode for the transmitting device 510 to provide a warning to the receiving device 610 that the transmitting device will change a data stream received at the data port 640 from a first mode to a second mode. In some embodiments, upon detecting an anticipated mode change based on a mode packet, the receiving device 610 is operable to take action to prepare for the change in modes. In some embodiments, the captured mode packets may be unencrypted and may be captured without decryption and without affecting an encrypted data stream.

Figure 7:
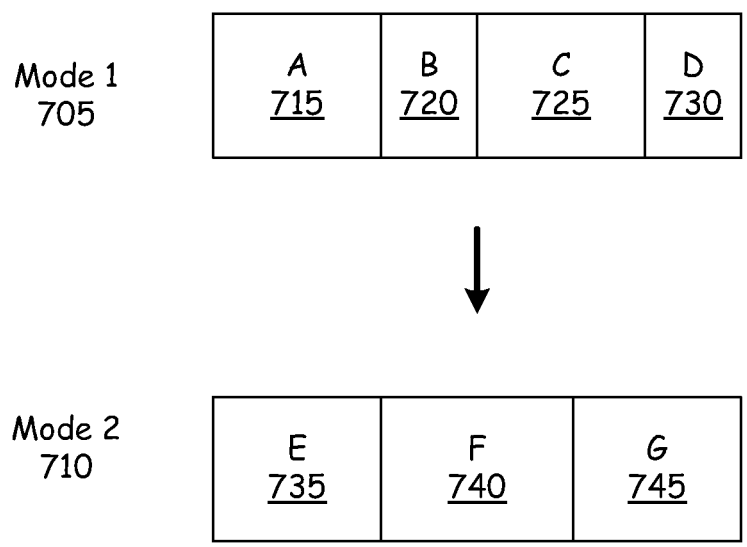
FIG. 7 is an illustration of a data stream that is switched between modes in an embodiment of data transmission.

FIG. 7 is an illustration of a data stream that is switched between modes in an embodiment of data transmission. In one example, the first mode may represent a first type of data and the second mode may represent a second type of data. In one example, data in the first mode may include data elements A 715, B 720, C 725, and D 730, while data in the second mode 710 may include data elements E 735, F 740, and G 745. In some embodiments, a mode change may include a change in content protection, such as a change from unencrypted data to encrypted data. Because of the incompatibility of the first mode and the second mode, continuing to treat the second mode data as first mode data while a receiving device is detecting the change may result in problems in data transmission or usage. In one example, if the data is video or audio data, then the transition between modes may induce significant noise during the transition. In some embodiments, a receiving device will operate to mute or otherwise handle the data during transition between modes to avoid such problems.

Figure 8:
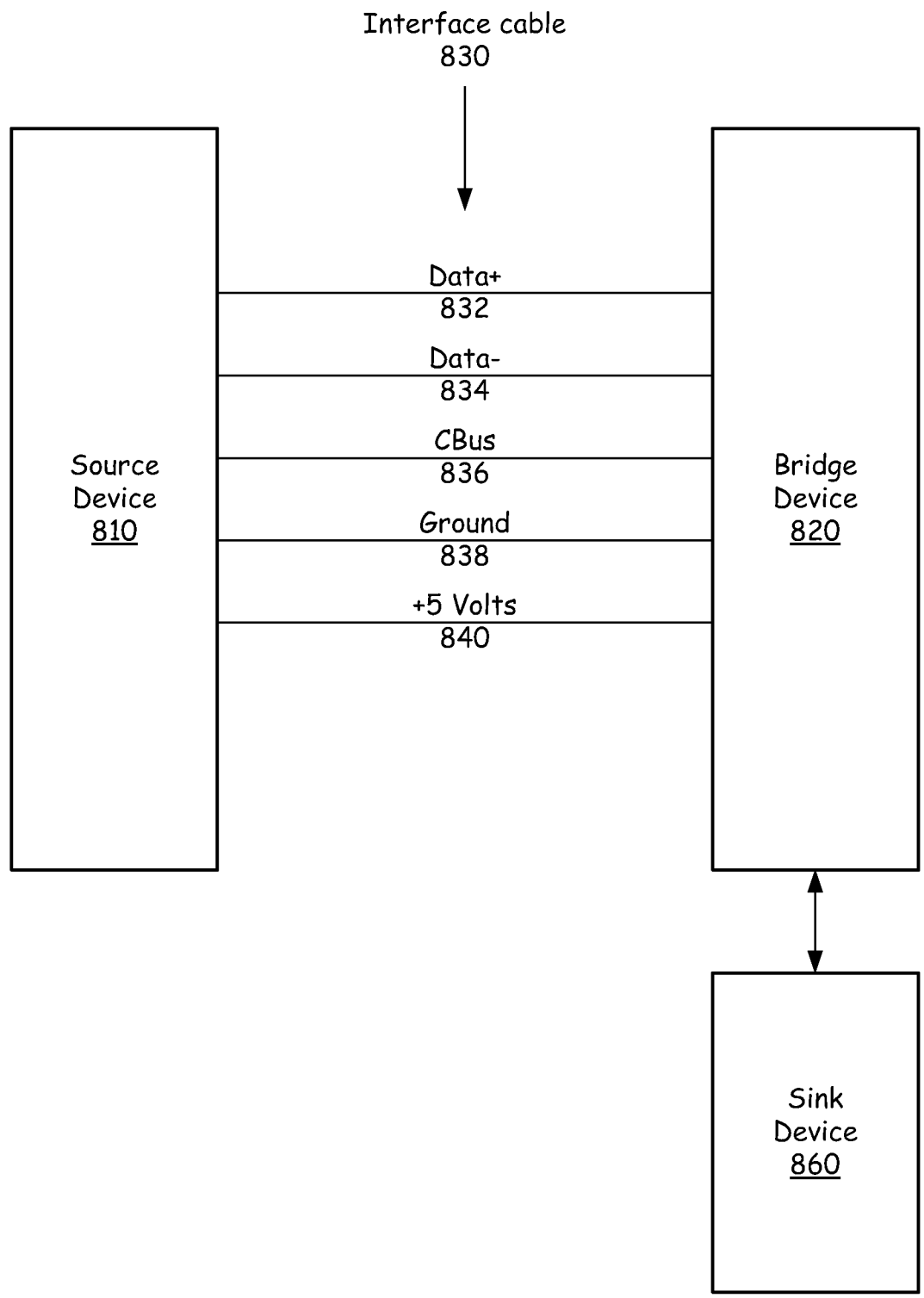
FIG. 8 is an illustration of an interface between devices for an embodiment of a system.

FIG. 8 is an illustration of an interface between devices for an embodiment of a system. In some embodiments, a first device may be a source device 810 and a second device is a bridge device 820, such as MHL source and bridge devices, with the devices being linked via an interface, such as interface cable 830. The bridge device then may be linked to a receiving device 860, such as an HDMI sink device. In some embodiments, the source device 810 may send a data stream to the bridge device 820, with the data stream being sent as differential signals via data+ line 832 and data− line 834, and the bridge device may re-transmit such data stream to the receiving device 850. The cable may further include control line CBus 836. The interface 830 may further additional lines, illustrated as a ground line 838 and a line carrying a 5 volt potential 840.

In some embodiments, the source device 810 may change the transmission of the data stream from a first mode to a second mode, and prior to transitioning to the second mode the source device 810 may send multiple mode packets via data lines data+ line 832 and data− line 834 during blanking periods between periods of content data to inform the bridge device 820 that the data stream will be transitioning from the first mode to the second mode. Upon detecting and capturing one or more mode packets, the bridge device 820 will take action to prepare for the transition between data modes.

Figure 9:
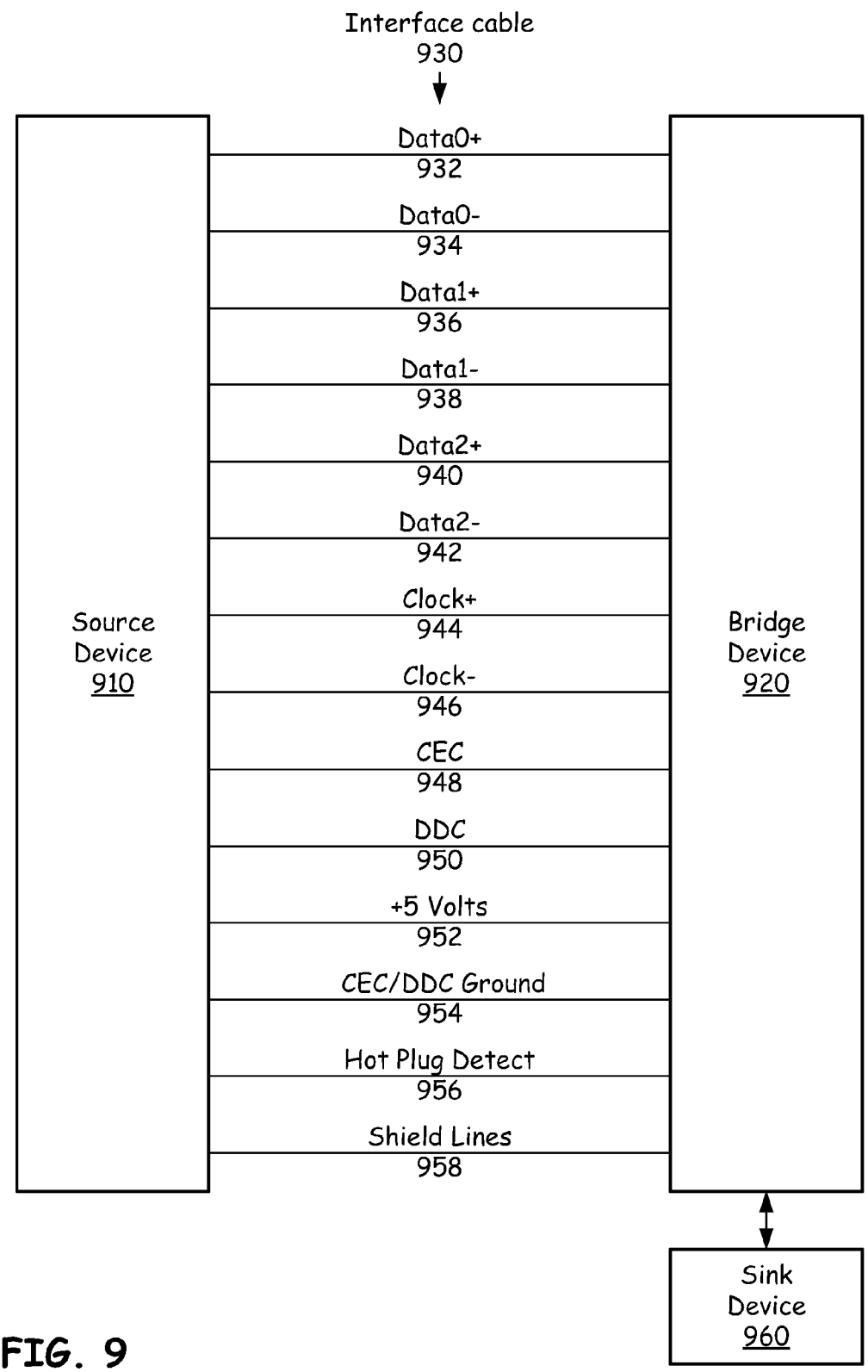
FIG. 9 is an illustration of an interface between devices for an embodiment of a system.

FIG. 9 is an illustration of an interface between devices for an embodiment of a system. In some embodiments, a first device may be a source device 910 and a second device is a bridge device 920, such as HDMI source and bridge devices, with the devices being linked via an interface, such as interface cable 930. The bridge device then may be linked to a receiving device 960, such as an HDMI sink device. In some embodiments, the source device 810 may send a data stream to the bridge device 920 via cable 930, with the data stream being sent as HDMI differential signals via data0+ line 932, data0− line 934, data1+ line 936, data1− line 938, data2+ line 940, and data2− line 942, and the bridge device may re-transmit such data stream to the receiving device 960. The cable may further include differential clock lines clock+ 944 and clock− 946; Consumer Electronics Control (CEC) control bus 948; Display Data Channel (DDC) bus 950; +5 volts power 952, CEC/DDC ground 954; hot plug detect 956; and four shield lines for the differential signals.

In some embodiments, In some embodiments, the source device 910 may change the transmission of the data stream from a first mode to a second mode, and prior to transitioning to the second mode the source device 910 may send multiple mode packets via data lines data0+ line 932, data0− line 934, data1+ line 936, data1− line 938, data2+ line 940, and data2− line 942 during blanking periods between periods of content data to inform the bridge device 920 that the data stream will be transitioning from the first mode to the second mode. Upon detecting and capturing one or more mode packets, the bridge device 920 will take action to prepare for the transition between data modes.

Figure 10:
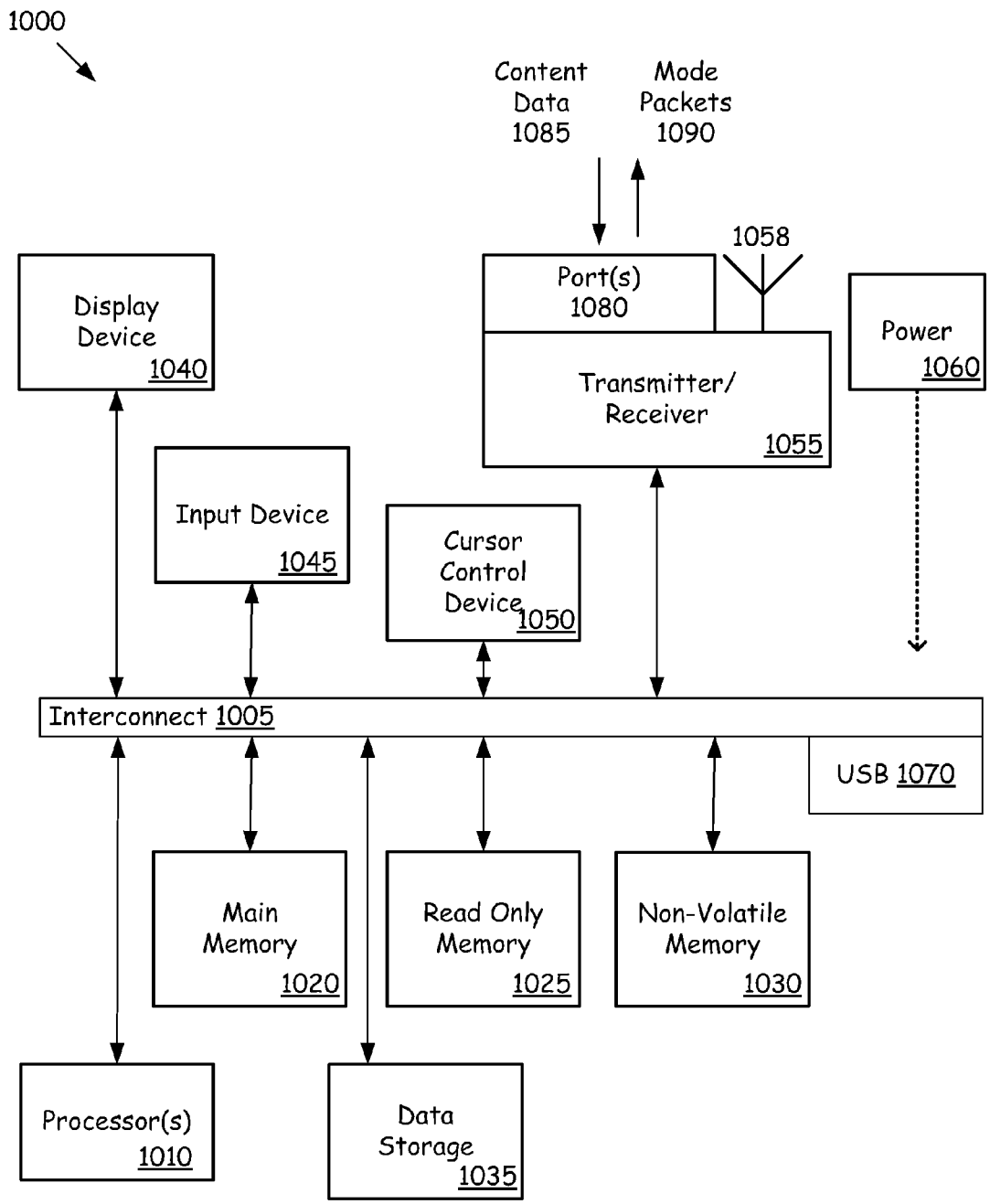
FIG. 10 is an illustration of elements of an embodiment of a transmitting or receiving device.

FIG. 10 is an illustration of elements of an embodiment of a transmitting or receiving device. In this illustration, certain standard and well known components that are not germane to the present description are not shown. Under some embodiments, a device 1000 may be a transmitting device, a receiving device, or both.

Under some embodiments, the device 1000 comprises an interconnect or crossbar 1005 or other communication means for transmission of data. The data may include audio-visual data and related control data. The device 1000 may include a processing means such as one or more processors 1010 coupled with the interconnect 1005 for processing information. The processors 1010 may comprise one or more physical processors and one or more logical processors. Further, each of the processors 1010 may include multiple processor cores. The interconnect 1005 is illustrated as a single interconnect for simplicity, but may represent multiple different interconnects or buses and the component connections to such interconnects may vary. The interconnect 1005 shown in FIG. 10 is an abstraction that represents any one or more separate physical buses, point-to-point connections, or both connected by appropriate bridges, adapters, or controllers. The interconnect 1005 may include, for example, a system bus, a PCI or PCIe bus, a HyperTransport or industry standard architecture (ISA) bus, a small computer system interface (SCSI) bus, a IIC (I2C) bus, or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements) The device 1000 further may include a serial bus, such as USB bus 1070, to which may be attached one or more USB compatible connections.

In some embodiments, the device 1000 further comprises a random access memory (RAM) or other dynamic storage device as a main memory 1020 for storing information and instructions to be executed by the processors 1010. Main memory 1020 also may be used for storing data for data streams. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). In some embodiments, memory of the system may certain registers or other special purpose memory. The device 1000 also may comprise a read only memory (ROM) 1025 or other static storage device for storing static information and instructions for the processors 1010. The device 1000 may include one or more non-volatile memory elements 1030 for the storage of certain elements.

Data storage 1035 may also be coupled to the interconnect 1005 of the device 1000 for storing information and instructions. The data storage 1035 may include a magnetic disk, an optical disc and its corresponding drive, or other memory device. Such elements may be combined together or may be separate components, and utilize parts of other elements of the device 1000.

The device 1000 may also be coupled via the interconnect 1005 to a display or presentation device 1040. In some embodiments, the display may include a liquid crystal display (LCD), a plasma display, a cathode ray tube (CRT) display, or any other display technology, for displaying information or content to an end user. In some embodiments, the display 1040 may be utilized to display television programming. In some environments, the display 1040 may include a touchscreen that is also utilized as at least a part of an input device. In some environments, the display 1040 may be or may include an audio device, such as a speaker for providing audio information, including the audio portion of a television program. An input device 1045 may be coupled to the interconnect 1005 for communicating information and/or command selections to the processors 1010. In various implementations, the input device 1045 may be a keyboard, a keypad, a touch screen and stylus, a voice activated system, or other input device, or combinations of such devices. Another type of user input device that may be included is a cursor control device 1050, such as a mouse, a trackball, or cursor direction keys for communicating direction information and command selections to the one or more processors 1010 and for controlling cursor movement on the display 1040.

One or more transmitters or receivers 1055 may also be coupled to the interconnect 1005. In some embodiments the device 1000 may include one or more ports 1080 for the reception or transmission of data. Data that may be received or transmitted may include video data or audio-video data, such as HDMI and MHL data, and may be encrypted for transmission, such as HDCP encrypted data. In some embodiments, the device includes one or more ports for the transmission and/or reception of data 1080 for the transfer of content data 1085. In some embodiments, the device 1000 may transmit or receive one or more mode packets 1090 in blanking intervals between transmission of content data 1085 in anticipation of a change in data transmission mode. In addition, the device 1000 may include a USB (Universal Serial Bus) 1070.

The device 1000 may further include one or more antennas 1058 for the reception of data via radio signals. The device 1000 may also comprise a power device or system 1060, which may comprise a power supply, a battery, a solar cell, a fuel cell, or other system or device for providing or generating power. The power provided by the power device or system 1060 may be distributed as required to elements of the device 1000.

In the description above, for the purposes of explanation, numerous specific details are set forth in order to provide a thorough understanding of the present invention. It will be apparent, however, to one skilled in the art that the present invention may be practiced without some of these specific details. In other instances, well known structures and devices are shown in block diagram form. There may be intermediate structure between illustrated components. The components described or illustrated herein may have additional inputs or outputs which are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Portions of the present invention may be provided as a computer program product, which may include a computer-readable medium having stored thereon computer program instructions, which may be used to program a computer (or other electronic devices) to perform a process according to the present invention. The computer-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/computer-readable medium suitable for storing electronic instructions. Moreover, the present invention may also be downloaded as a computer program product, wherein the program may be transferred from a remote computer to a requesting computer.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

What is claimed is:

1. A method comprising:
transmitting a data stream over a data link from a first device to a second device, the data stream including a plurality of frames, the data stream being transmitted in a first data transmission mode;
determining a data transmission mode change from the first data transmission mode to a second data transmission mode for the transmission of the data stream from the first device to the second device;
determining whether the data transmission mode change from the first data transmission mode to the second data transmission mode is expected to cause instability in the data stream, wherein instability in the data stream includes instability in frame timing during transition to the second data transmission mode;
generating a plurality of mode packets, each of the plurality of mode packets including fields to define a plurality of mode elements, the fields of the mode packet being set to indicate the data transmission mode change and to indicate whether the data stream is expected to be unstable during a transition between data transmission modes; and
transmitting the plurality of mode packets to the second device prior to implementing the data transmission mode change.

2. The method of claim 1, wherein each of the plurality of mode packets is transmitted in an interval between lines of a frame of data.

3. The method of claim 1, wherein the mode packets are transmitted multiple times per frame of data.

4. The method of claim 1, wherein the mode packets are transmitted continuously by the first device.

5. The method of claim 1, wherein each mode packet is transmitted during a re-keying interval after transmission of data.

6. The method of claim 1, wherein generating each mode packet includes encoding of one or more flags to provide notice of changes in data transmission mode.

7. The method of claim 6, wherein encoding the one or more flags includes encoding a first flag to indicate an anticipated change in data transmission mode and encoding a second flag to indicate expected instability of the data stream.

8. The method of claim 7, wherein encoding the one or more flags includes encoding a third flag to indicate a type of data transmission mode change.

9. The method of claim 1, wherein the data stream comprises multimedia data, and where the data transmission mode change includes one or more of a color space change, a video mode change, an audio mode change, or status of content protection.

10. The method of claim 1, wherein the data stream is transmitted in an encrypted form and each mode packet is transmitted in an unencrypted form.

11. The method of claim 10, wherein each mode packet can be stripped out of the data stream without decryption or reencryption of data.

12. The method of claim 1, wherein generating each mode packet includes inserting a lead guard band into the mode packet to trigger the second device to capture the mode packet.

13. A method comprising:
receiving a data stream over a data link from a first device at a second device, the data stream including a plurality of frames of data;
sampling the data link for one or more mode packets;
capturing a mode packet during the sampling of the data link, the mode packet indicating a mode of data transmission from the first device and indicating expected stability of the data stream in response to the change of mode of data; and
determining an anticipated change in mode of data transmission from a first data transmission mode to a second data transmission mode and whether the data stream is expected to be unstable during a transition between data transmission modes based on the mode packet, wherein instability in the data stream includes instability in frame timing during transition to the second data transmission mode.

14. The method of claim 13, wherein determining an anticipated change in mode of data transmission from a first data transmission mode to a second data transmission mode based on the mode packet includes interpreting one or more flags contained in the mode packet.

15. The method of claim 13, further comprising determining a type of mode change based on the mode packet.

16. The method of claim 13, further comprising taking action to prepare for the transition of the data stream to the second data transmission mode based on the mode packet.

17. The method of claim 16, wherein, upon determining that the data stream is expected to be unstable, the data stream includes audiovisual data and preparation for the transition of the data stream to the second data transmission mode includes one or more of muting an audio signal or blanking a video signal.

18. The method of claim 13, wherein sampling comprises sampling during a blanking interval between lines of a first frame of data.

19. The method of claim 13, wherein sampling comprise sampling at least once per frame of data.

20. The method of claim 13, wherein capturing the mode packet includes detecting a guard band for the mode packet.

21. The method of claim 13, wherein the mode packet is unencrypted and the data stream is encrypted.

22. The method of claim 21, further comprising stripping the mode packet out of the data stream, and wherein the stripping of the mode packet out of the data stream has no effect on synchronization of the encrypted data content stream.

23. A transmitting device comprising:
a controller to control transmission of data from the transmitting device;
a transmitter to transmit a data stream to a receiving device;
a mode packet engine to generate a plurality of mode packets, the mode packets indicating a mode of the transmission of the data stream, the mode packets to provide notice of a change in mode of the transmission of the data stream and notice regarding stability of the data stream in response to the change in data transmission mode, the mode packets to indicate whether the data stream is expected to be unstable during a transition between modes of transmission, wherein instability in the data stream includes instability in frame timing during the transition between the modes of transmission; and
a data link to the receiving device, the transmitter to transmit the data stream in a plurality of modes of transmission and the mode packets on the data link, the data stream including a plurality of frames of data.

24. The transmitting device of claim 23, further comprising an encryption engine to encrypt the data stream prior to transmission to the receiving device, wherein the mode packets are transmitted in unencrypted form.

25. The transmitting device of claim 23, wherein the transmitter is to transmit the mode packets during intervals between lines of a first frame of data.

26. The transmitting device of claim 23, wherein the transmitter is to transmit each mode packet during a re-keying interval after transmission of data.

27. The transmitting device of claim 23, wherein the mode packet engine continuously generates mode packets.

28. A receiving device comprising:
   a controller to control handling of data received from a transmitting device;
   a receiver to receive a data stream from the transmitting device, the data stream including a plurality of frames of data;
   a data link from the transmitting device, the receiving device to receive and sample the data stream on the data link; and
   a detection engine to detect a mode packet on the data link, the mode packet to indicate a mode of transmission of the data stream, the receiving device to determine an expected change in mode of data transmission from a first data transmission mode to a second data transmission mode and whether the data stream is expected to be unstable during a transition between modes of data transmission based on the mode packet, wherein instability in the data stream includes instability in frame timing during the transition to the second data transmission mode.

29. The receiving device of claim 28, wherein the controller is to direct action to prepare for the transition of the transmission of the data stream from the first data transmission mode to the second data transmission mode.

30. The receiving device of claim 28, wherein the receiving device samples the data link during a blanking interval between lines of a first frame of data to detect the mode packet.

31. The receiving device of claim 28, wherein the detection engine is to detect a guard band of the mode packet.

32. The receiving device of claim 28, further comprising a second data link to receive a second data stream, wherein the receiving device operates to sample the data stream of the data link during a first time period and to sample the second data stream of the second data link during a second time period.

* * * * *

UNITED STATES PATENT AND TRADEMARK OFFICE
CERTIFICATE OF CORRECTION

PATENT NO. : 8,644,334 B2
APPLICATION NO. : 12/570874
DATED : February 4, 2014
INVENTOR(S) : William Conrad Altmann It is certified that error appears in the above-identified patent and that said Letters Patent is hereby corrected as shown below:

In the Claims

Column 13, Claim 11, line 63, delete "reencrypion" and insert --re-encryption--.
Column 14, Claim 19, line 39, delete "sampling comprise" and insert --sampling comprises--.

Signed and Sealed this
Twenty-fifth Day of November, 2014

Michelle K. Lee
*Deputy Director of the United States Patent and Trademark Office*